United States Patent
Ma et al.

(10) Patent No.: US 10,594,144 B2
(45) Date of Patent: Mar. 17, 2020

(54) ELECTRONIC DEVICE AND METHOD OF CHARGING ELECTRONIC DEVICE

(71) Applicant: Lenovo (Beijing) Co., Ltd., Beijing (CN)

(72) Inventors: Chao Ma, Beijing (CN); Leiyu Wang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 457 days.

(21) Appl. No.: 14/617,167

(22) Filed: Feb. 9, 2015

(65) Prior Publication Data

US 2016/0072319 A1    Mar. 10, 2016

(30) Foreign Application Priority Data

Sep. 10, 2014  (CN) .......................... 2014 1 0457864

(51) Int. Cl.
*H02J 7/00* (2006.01)

(52) U.S. Cl.
CPC ............ *H02J 7/0029* (2013.01); *H02J 7/007* (2013.01)

(58) Field of Classification Search
CPC .................................................. H02J 7/0029
See application file for complete search history.

(56) References Cited

U.S. PATENT DOCUMENTS

| | | |
|---|---|---|
| 5,872,444 A | 2/1999 | Nagano |
| 5,905,362 A | 5/1999 | Nagano |
| 6,008,620 A * | 12/1999 | Nagano ................. H02J 7/0073 320/106 |
| 7,528,574 B1 * | 5/2009 | Adkins ................. H01M 10/44 320/128 |
| 8,210,273 B2 | 7/2012 | Suzuki |
| 8,330,426 B2 | 12/2012 | Suzuki |
| 8,384,349 B2 | 2/2013 | Suzuki |
| 8,742,724 B2 | 6/2014 | Suzuki |
| 2002/0117939 A1 * | 8/2002 | Kawamoto ......... F02D 41/2096 310/316.03 |
| 2003/0057922 A1 * | 3/2003 | Odaohhara ........... H02J 7/0047 320/164 |

(Continued)

FOREIGN PATENT DOCUMENTS

| | | |
|---|---|---|
| CN | 1163500 | 10/1997 |
| CN | 1322049 | 11/2001 |

(Continued)

OTHER PUBLICATIONS

WO 2015106390 translation LIU, Electronic cigarette identification device, Jul. 2015.*

(Continued)

*Primary Examiner* — Robert Grant
*Assistant Examiner* — Tynese V McDaniel
(74) *Attorney, Agent, or Firm* — Brinks Gilson & Lione; John C. Freeman

(57) ABSTRACT

A method of charging an electronic device and an electronic device includes a charger receiving first information from the electronic device; determining a charge state of the electronic device according to the first information, generating a first instruction if the charge state of the electronic device is determined to be abnormal, and adjusting the power supplied to the electronic device based on the first instruction.

20 Claims, 5 Drawing Sheets

--- the first electronic device receives first information transmitted from the second electronic device in a first strategy, in a process of supplying power to the second electronic device by the first electronic device — 101 a charge state of the second electronic device is judged according to the first information, and a first instruction is generated when it is determined that the second electronic device is in an abnormal charge state — 102 a first operation for lowering an output power consumption is performed based on the first instruction — 103

(56) References Cited

U.S. PATENT DOCUMENTS

| | | | | |
|---|---|---|---|---|
| 2010/0085018 A1* | 4/2010 | Cruise | ............... | H01M 10/425 |
| | | | | 320/150 |
| 2010/0085020 A1* | 4/2010 | Suzuki | ..................... | B25F 5/00 |
| | | | | 320/157 |
| 2011/0006739 A1* | 1/2011 | Chishima | ......... | H04W 52/0261 |
| | | | | 320/136 |
| 2013/0082662 A1* | 4/2013 | Carre | ................... | H02J 7/0052 |
| | | | | 320/134 |
| 2013/0223102 A1* | 8/2013 | Williams | .............. | H01R 31/06 |
| | | | | 363/13 |
| 2015/0006395 A1* | 1/2015 | Chu | ...................... | G06Q 20/40 |
| | | | | 705/44 |
| 2016/0345627 A1* | 12/2016 | Liu | ...................... | A24F 47/008 |

FOREIGN PATENT DOCUMENTS

| | | | | |
|---|---|---|---|---|
| CN | 101719685 | 6/2010 | | |
| CN | 101951001 | 1/2011 | | |
| CN | 103236568 | 8/2013 | | |
| WO | WO 2015106390 A1 * | 7/2015 | .......... | A24F 47/008 |

OTHER PUBLICATIONS

First Office Action dated Dec. 29, 2017 (56 pages including English translation) from Chinese priority Application No. 201410457864.6.

* cited by examiner

ELECTRONIC DEVICE AND METHOD OF CHARGING ELECTRONIC DEVICE

BACKGROUND

This application claims priority under 35 U.S.C. § 119a to Chinese Patent Application No. 201410457864.6, filed on Sep. 10, 2014.

The present disclosure relates to the field of charge protection, and particularly to an information processing method and an electronic device.

Currently, a charge device is charged by a charge adapter connected thereto through a charge cable. With an increase of a battery capacity of an electronic device, an output current of the charge adapter is increased too. In the charge process, once a failure occurs outside of the electronic device, such as the charge cable, a charge cable interface, due to various reasons, it will not be detected by both the electronic device and the charge adapter, which will cause a damage to the electronic device. If there is an information processing scheme in which the charge adapter acquires the charge state of the electronic device in the process of charging to the electronic device so as to lower the output current or even to turn off the output current when the charging to the electronic device is abnormal, the damage to the electronic device will be avoided. However, there is no effective solution to this problem in the related art.

SUMMARY

In view of the technical problem in the related art, an information processing method and an electronic device are provided in embodiments of the present disclosure, which can make the charge adapter lower the output power consumption when the charging to the electronic device is abnormal, so that the damage to the electronic device in the charge process can be avoided.

According to an embodiment of the present disclosure, a method of charging an electronic device is provided, the method comprising: a charger receiving first information from the electronic device; the charger determining a charge state of the electronic device according to the first information, and generating a first instruction if the charge state of the electronic device is determined to be abnormal; and the charger adjusting power supplied to the electronic device based on the first instruction.

According to another embodiment of the present disclosure, a charger is provided, comprising: an acquiring unit configured to receive first information from an electronic device; a determining unit configured to receive the first information from the acquiring unit and determine a charge state of the electronic device according to the first information; and a performing unit configured to adjust power supplied to the electronic device, if the determining unit determines that the charge state of the electronic device is abnormal.

According to still another embodiment of the present disclosure, an electronic device is provided, comprising: a transmitting unit configured to transmit a first information to a charger; and a charging unit configured to obtain power supplied from the charger for charging.

According to a further embodiment of the present disclosure, a computer readable storage medium is provided, the medium being embodied with a computer program instruction which, when executed by a processor of a computer, performs the above method.

DETAILED DESCRIPTION

The present disclosure will be described in further detail with reference to the accompany drawings and specific embodiments.

First Embodiment

Figure 1:
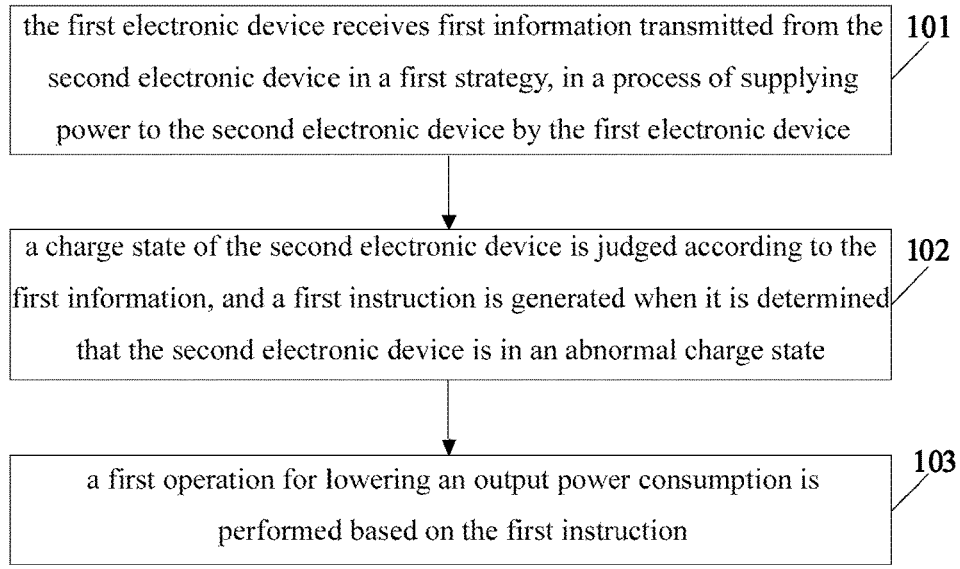
FIG. 1 is a schematic flowchart of an information processing method according to a first embodiment of the present disclosure.

An information processing method is provided in an embodiment of the present disclosure. The information processing method is applied to a first electronic device which is capable of communicating with a second electronic device and supplying power to the second electronic device. FIG. 1 is a schematic flowchart of an information processing method according to a first embodiment of the present disclosure. As shown in FIG. 1, the method comprises the following steps.

At a step 101, the first electronic device receives first information transmitted from the second electronic device in a first strategy, in a process of supplying power to the second electronic device by the first electronic device.

In the present embodiment, the first electronic device may be a device which can charge to a second electronic device by plugging on a commercial plug, such as a charge adapter or the like. Further, the first electronic device may also be a device which can charge to the second electronic device, such as a personal computer, a notebook computer or the like. The second electronic device may be a terminal device having a charge battery such as a cell phone, a tablet, a notebook computer or the like.

The first electronic device is arranged with a power supply interface, the second electronic device is arranged with a charge interface which is connected to the power supply interface by a cable when the second electronic device is supplied power by the first electronic device; and the first electronic device and the electronic device communicate with each other by the power supply interface, the cable and the charge interface. Optionally, the power supply interface of the first electronic device and the charge interface of the second electronic device may be Universal Serial Bus (USB) interfaces, such as a Micro USB interface or a Mini USB interface.

Herein, the first electronic device and the second electronic device may communicate through the USB interface. Particularly, taking an example in which the charge interface is a Mini USB interface, the Mini USB interface has four pins corresponding to four lines of the data lines. Particularly, the four lines corresponding to the four pins bear the power (VBUS), the positive data (D+), the negative data (D−) and the ground (GND) respectively. In the charge process described in the present embodiment, the first electronic device charges the second electronic device through the VBUS in the charge interface and the VBUS line in the corresponding data line.

The first electronic device and the second electronic device may establish a communication mechanism through the VBUS. Particularly, the transmitting party may modulate the information to be transmitted into a high frequency carrier, and transmit the high frequency carrier through the VBUS. The receiving party demodulates the received high frequency carrier and obtains the information. Alternatively, the first electronic device and the second electronic device may communicate by the Tx/Rx signal through the D+ and/or D− differential line duplex UART serial port. Alternatively, the first electronic device and the second electronic device may communicate by adjusting the level configuration of D+ and/or D−. Alternatively, the first electronic device and the second electronic device may communicate through the modulation pulse. For example, five pulses are transmitted in which the former three pulses are long pulses and the latter two pulses are short pulses, that is, the three-long-two-short pulse signal indicates a preset information meaning. Alternatively, the first electronic device and the second electronic device may communicate through a wireless communication module arranged within the first electronic device and the second electronic device. The wireless communication module may be a wireless communication module such as a Bluetooth module, an infrared module or the like.

In the present embodiment, the first information may be information indicating whether the current charge state of the second electronic device is normal or not. Particularly, the first information may be a current charge parameter of the second electronic device, which may be at least one of a charge current value, a charge voltage value, a temperature value of a charge interface, or the like. When the first information is the above charge parameter, the first strategy may be that the second electronic device transmits it to the first electronic device in a preset cycle. The first information may also be a signal indicated by the current charge parameter of the second electronic device, which may be at least one of an over-current signal, an over-voltage signal, an over-temperature signal, or the like. When the first information is the above signal, the first strategy may be that the second electronic device transmits the signal to the first electronic device immediately when it generates the above signal.

In another implementation, the first information may be a normal signal which cannot indicate the current charge state of the second electronic device itself. In this case, the first strategy is that the second electronic device transmits the first information to the first electronic device in every first preset time period. The first electronic device may judge the current charge state of the second electronic device by judging whether the first information is received or not in the preset first time period.

At a step 102, a charge state of the second electronic device is judged according to the first information, and a first instruction is generated when it is determined that the second electronic device is in an abnormal charge state.

Herein, when the first information is the current charge parameter of the second electronic device, it is judged whether the value of the charge parameter is in a first preset threshold range. When the result of the judgment is yes, it may be determined that the second electronic device is in the normal charge state. When the result of the judgment is no, it may be determined that the second electronic device is in the abnormal charge state.

When the first information is the signal indicated by the current charge parameter such as the current signal, the voltage signal or the temperature signal, of the second electronic device, the current charge state of the second electronic device may be determined by the relationship between the preset signal value and the charge state. For example, it is preset that the voltage signal value of 0 is a signal value corresponding to the normal voltage state, and the voltage signal value of 1 is a signal value corresponding to the abnormal voltage state. When the first information is the current signal or the temperature signal, the current state or the temperature state can be determined with reference to the way of determining the voltage state based on the voltage signal.

When the first information is a normal signal, the first electronic device may follow the preset first strategy. That is, the second electronic device transmits the first information to the first electronic device in every first preset time period. The first electronic device judges whether the first information transmitted from the second electronic device is received in the second preset time period larger than the first preset time period or not. When the result of the judgment is yes, it may be determined that the second electronic device is currently in the normal charge state. When the result of the judgment is no, it may be determined that the second electronic device is currently in the abnormal charge state. Particularly, although the second preset time period is larger than the first preset time period, there is no large difference between the second preset time period and the first preset time period. For example, the first preset time period may be 1 minute, and the second preset time period may be 1 minute and 10 seconds.

At a step 103, a first operation for lowering an output power consumption is performed based on the first instruction.

Herein, when the first electronic device determines that the second electronic device is in the abnormal charge state, the output power consumption is lowered by the first operation, which lowers the output current or turns off the output current directly.

With the technical solution of the embodiment of the present disclosure, it is realized that the first electronic device adjusts the output power consumption adaptively according to the charge state of the second electronic device, so that various damages to the second electronic device in the charge process are avoided effectively.

Second Embodiment

Figure 2:
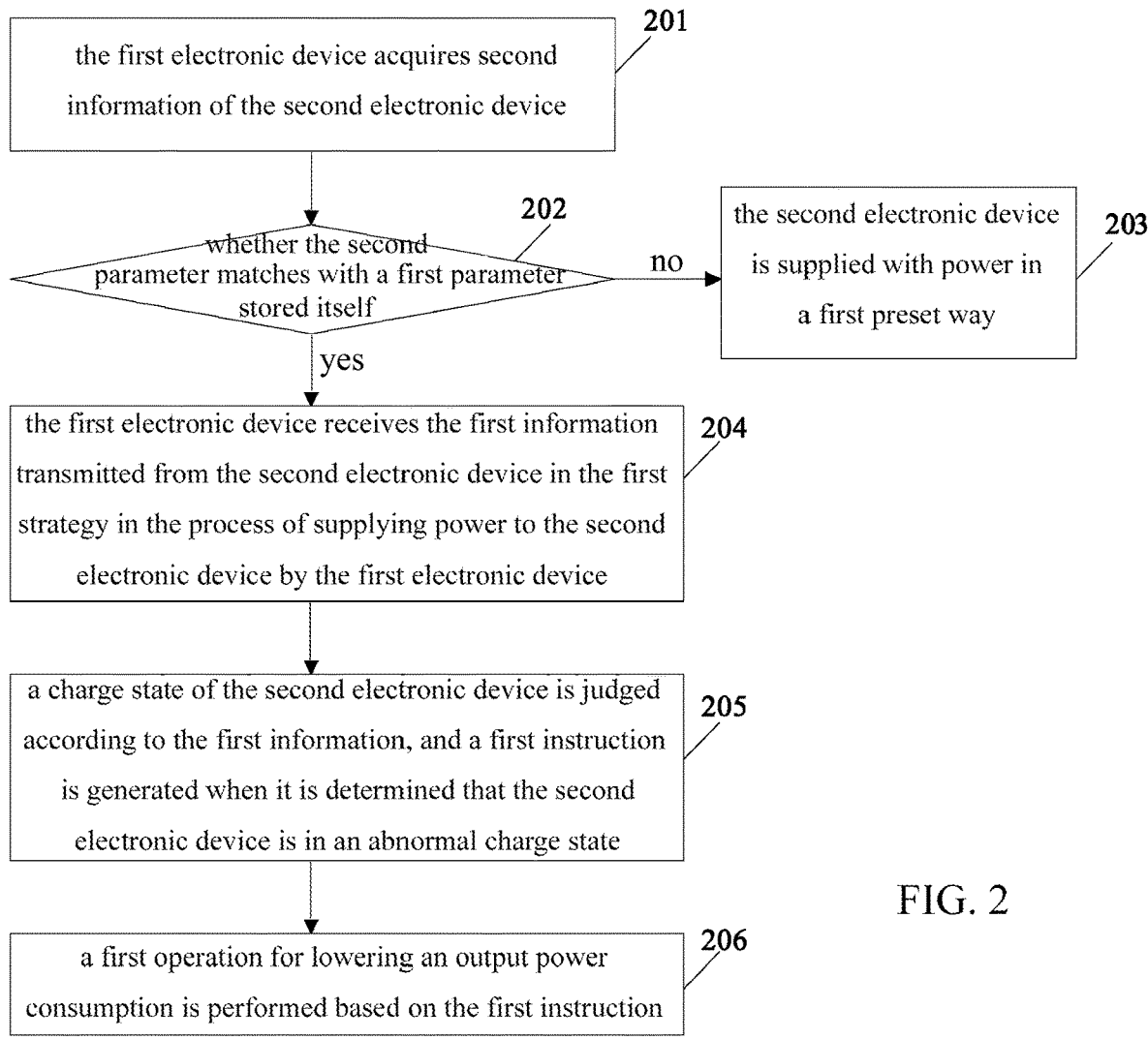
FIG. 2 is a schematic flowchart of an information processing method according to a second embodiment of the present disclosure.

An information processing method is provided in an embodiment of the present disclosure. The information processing method is applied to a first electronic device which is capable of communicating with a second electronic device and supplying power to the second electronic device. FIG. 2 is a schematic flowchart of an information processing method according to a second embodiment of the present disclosure. As shown in FIG. 2, the method comprises the following steps.

At a step 201, the first electronic device receives second information of the second electronic device, the second information is used to indicate a second parameter of the second electronic device.

In the present embodiment, the first electronic device may be a device which can charge to a second electronic device by plugging on a commercial plug, such as a charge adapter or the like. Further, the first electronic device may also be a device which can charge to the second electronic device, such as a personal computer, a notebook computer or the like. The second electronic device may be a terminal device having a charge battery such as a cell phone, a tablet, a notebook computer or the like.

The first electronic device is arranged with a power supply interface, the second electronic device is arranged with a charge interface which is connected to the power supply interface by a cable when the second electronic device is supplied power by the first electronic device; and the first electronic device and the electronic device communicate with each other by the power supply interface, the cable and the charge interface. Optionally, the power supply interface of the first electronic device and the charge interface of the second electronic device may be Universal Serial Bus (USB) interfaces, such as a Micro USB interface or a Mini USB interface.

Herein, the first electronic device and the second electronic device may communicate through the USB interface. Particularly, taking an example in which the charge interface is a Mini USB interface, the Mini USB interface has four pins corresponding to four lines of the data lines. Particularly, the four lines corresponding to the four pins bear the power (VBUS), the positive data (D+), the negative data (D−) and the ground (GND) respectively. In the charge process described in the present embodiment, the first electronic device charges the second electronic device through the VBUS in the charge interface and the VBUS line in the corresponding data line.

The first electronic device and the second electronic device may establish a communication mechanism through the VBUS. Particularly, the transmitting party may modulate the information to be transmitted into a high frequency carrier, and transmit the high frequency carrier through the VBUS. The receiving party demodulates the received high frequency carrier and obtains the information. Alternatively, the first electronic device and the second electronic device may communicate by the Tx/Rx signal through the D+ and/or D− differential line duplex UART serial port. Alternatively, the first electronic device and the second electronic device may communicate by adjusting the level configuration of D+ and/or D−. Alternatively, the first electronic device and the second electronic device may communicate through the modulation pulse. For example, five pulses are transmitted in which the former three pulses are long pulses and the latter two pulses are short pulses, that is, the three-long-two-short pulse signal indicates a preset information meaning. Alternatively, the first electronic device and the second electronic device may communicate through a wireless communication module arranged within the first electronic device and the second electronic device. The wireless communication module may be a wireless communication module such as a Bluetooth module, an infrared module or the like.

Herein, the second parameter may be an identification, a manufacture name or a type of the second electronic device. When the first electronic device and the second electronic device are connected through the power supply interface, the cable and the charge interface respectively, the first electronic device acquires the second information of the second electronic device via the above communication mechanism.

At a step 202, it is judged whether the second parameter matches with a first parameter stored itself and a first judging result is obtained. When the judgment result is no, a step 203 is performed. When the judgment result is yes, a step 204 to a step 206 are performed.

Herein, the first electronic device has stored its attribute parameter therein, which is the first parameter comprising the identification, the manufacture name, the type or the like. When the first electronic device acquires the second parameter of the second electronic device, the second parameter is matched with the first parameter. For example, if the second parameter is the manufacture name of the first electronic device being AA and the first parameter is the manufacture name of the second electronic device being AA, it is determined that the second parameter matches with the first parameter. If the second parameter is the manufacture name of the first electronic device being AA and the first parameter is the manufacture name of the second electronic device being BB, it is determined that the second parameter does not match with the first parameter.

The first parameter may also be an attribute parameter of the second electronic device which can be matched with the first electronic device. The attribute parameter of the second electronic device may comprise parameters such as the manufacture name, the type, the identification or the like of the second electronic device.

At a step 203, the second electronic device is supplied with power in a first preset way.

Herein, when the second parameter does not match with the first parameter, it indicates that the second electronic device is not an electronic device matched with the first electronic device in standard configuration. It is not sure whether there is a damage to the second electronic device if the second electronic device is supplied with power by the first electronic device. Then, the second electronic device is supplied with power in the first preset way, which includes lowering an output current and supplying power to the second electronic device with the lowered output current; or rendering prompt information for an indication of supplying power to the second electronic device with a first output current or a second output current, the first output current being larger than the second output current; determining an output current according to an selection operation by a user, and supplying power to the second electronic device with the selected output current; or stopping supplying power to the second electronic device.

Particularly, when the second electronic device is supplied with power in the above first way, the first electronic device lowers the output current directly, so that it is avoided to supply the second electronic device with power with a normal output current, since an over-current will cause damage to the battery or the charge interface of the second electronic device.

When the second electronic device is supplied with power in the above second way, the first electronic device displays prompt information on its display screen, which may comprise at least two selection widgets for supplying power to the second electronic device with the first output current or supplying power to the second electronic device with the second output current in the present embodiment, wherein the first output current is larger than the second output current. Particularly, the first output current may be the nominal output current of the first electronic device, and the second output current may be a half of the first output current. Of course, the at least two selection widgets may be other preset content, for example, the current second electronic device is not matched and the power supply cannot be done.

At a step 204, the first electronic device receives the first information transmitted from the second electronic device in the first strategy in the process of supplying power to the second electronic device by the first electronic device.

In the present embodiment, the first information may be information indicating whether the current charge state of the second electronic device is normal or not. Particularly, the first information may be a current charge parameter of the second electronic device, which may be at least one of a charge current value, a charge voltage value, a temperature value of a charge interface, or the like. When the first information is the above charge parameter, the first strategy may be that the second electronic device transmits it to the first electronic device in a preset cycle. The first information may also be a signal indicated by the current charge parameter of the second electronic device, which may be at least one of an over-current signal, an over-voltage signal, an over-temperature signal, or the like. When the first information is the above signal, the first strategy may be that the second electronic device transmits the signal to the first electronic device immediately when it generates the above signal.

At a step 205, a charge state of the second electronic device is judged according to the first information, and a first instruction is generated when it is determined that the second electronic device is in an abnormal charge state.

Herein, when the first information is the current charge parameter of the second electronic device, it is judged whether the value of the charge parameter is in a first preset threshold range or not. When the result of the judgment is yes, it may be determined that the electronic device is in the normal charge state. When the result of the judgment is no, it may be determined that the electronic device is in the abnormal charge state.

When the first information is the signal indicated by the current charge parameter such as the current signal, the voltage signal or the temperature signal, of the second electronic device, the current charge state of the second electronic device may be determined by the relationship between the preset signal value and the charge state. For example, it is preset that the voltage signal value of 0 is a signal value corresponding to the normal voltage state, and the voltage signal value of 1 is a signal value corresponding to the abnormal voltage state. When the first information is the current signal or the temperature signal, the current state or the temperature state can be determined with reference to the way of determining the voltage state based on the voltage signal. When the first information is the signal indicated by the current charge parameter such as the over-current signal, the over-voltage signal or the over-temperature signal, the first electronic device may determine that the second electronic device is in the abnormal charge state immediately when it receives the first information.

At a step 206, a first operation for lowering an output power consumption is performed based on the first instruction.

Herein, when the first electronic device determines that the second electronic device is in the abnormal charge state, the output power consumption is lowered by the first operation, which lowers the output current or turns off the output current directly.

With the technical solution of the embodiment of the present disclosure, it is realized that the first electronic device adjusts the output power consumption adaptively according to the charge state of the second electronic device, so that various damages to the second electronic device in the charge process are avoided effectively.

Third Embodiment

Figure 3:
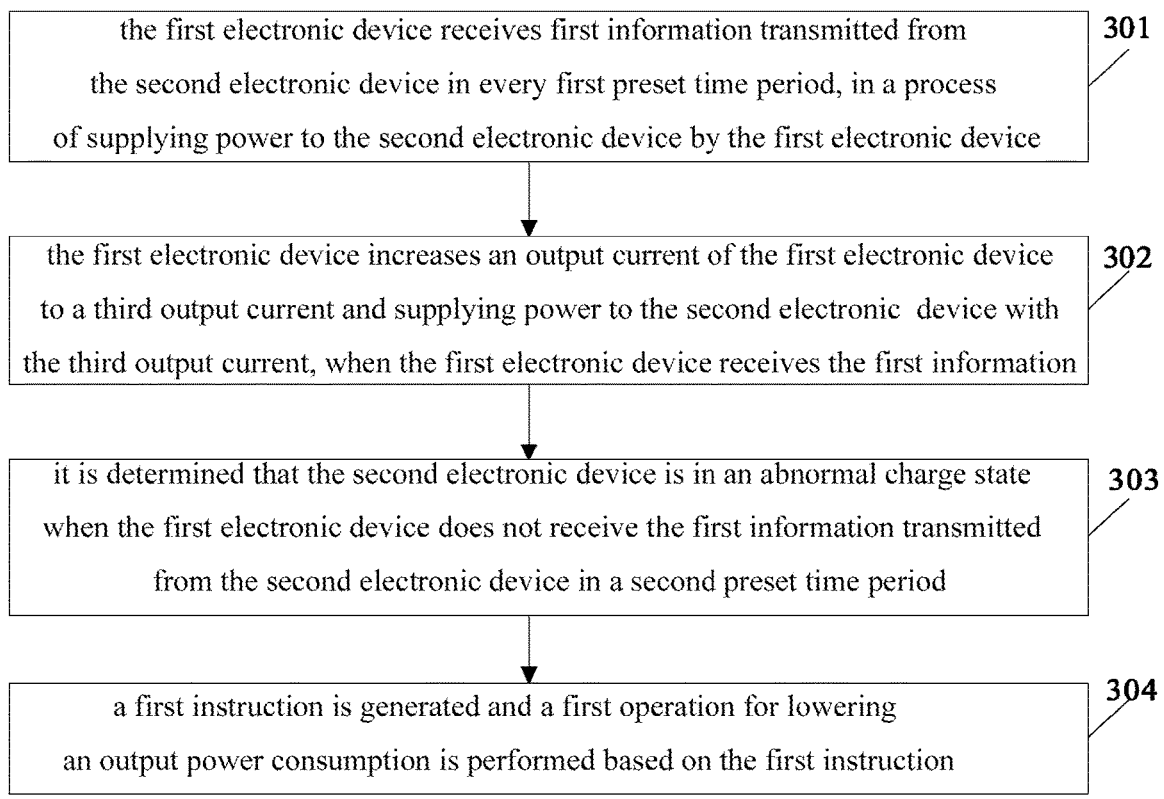
FIG. 3 is a schematic flowchart of an information processing method according to a third embodiment of the present disclosure.

An information processing method is provided in an embodiment of the present disclosure. The information processing method is applied to a first electronic device which is capable of communicating with a second electronic device and supplying power to the second electronic device. FIG. 3 is a schematic flowchart of an information processing method according to a third embodiment of the present disclosure. As shown in FIG. 3, the method comprises the following steps.

At a step 301, the first electronic device receives first information transmitted from the second electronic device in every first preset time period, in a process of supplying power to the second electronic device by the first electronic device.

In the present embodiment, the first electronic device may be a device which can charge to a second electronic device by plugging on a commercial plug, such as a charge adapter or the like. Further, the first electronic device may also be a device which can charge to the second electronic device, such as a personal computer, a notebook computer or the like. The second electronic device may be a terminal device having a charge battery such as a cell phone, a tablet, a notebook computer or the like.

The first electronic device is arranged with a power supply interface, the second electronic device is arranged with a charge interface which is connected to the power supply interface by a cable when the second electronic device is supplied power by the first electronic device; and the first electronic device and the electronic device communicate with each other by the power supply interface, the cable and the charge interface. Optionally, the power supply interface of the first electronic device and the charge interface of the second electronic device may be Universal Serial Bus (USB) interfaces, such as a Micro USB interface or a Mini USB interface.

Herein, the first electronic device and the second electronic device may communicate through the USB interface. Particularly, taking an example in which the charge interface is a Mini USB interface, the Mini USB interface has four pins corresponding to four lines of the data lines. Particularly, the four lines corresponding to the four pins bear the power (VBUS), the positive data (D+), the negative data (D−) and the ground (GND) respectively. In the charge process described in the present embodiment, the first electronic device charges the second electronic device through the VBUS in the charge interface and the VBUS line in the corresponding data line.

The first electronic device and the second electronic device may establish a communication mechanism through the VBUS. Particularly, the transmitting party may modulate the information to be transmitted into a high frequency carrier, and transmit the high frequency carrier through the VBUS. The receiving party demodulates the received high frequency carrier and obtains the information. Alternatively, the first electronic device and the second electronic device may communicate by the Tx/Rx signal through the D+ and/or D− differential line duplex UART serial port. Alternatively, the first electronic device and the second electronic device may communicate by adjusting the level configuration of D+ and/or D−. Alternatively, the first electronic device and the second electronic device may communicate through the modulation pulse. For example, five pulses are transmitted in which the former three pulses are long pulses and the latter two pulses are short pulses, that is, the three-long-two-short pulse signal indicates a preset information meaning. Alternatively, the first electronic device and the second electronic device may communicate through a wireless communication module arranged within the first electronic device and the second electronic device. The wireless communication module may be a wireless communication module such as a Bluetooth module, an infrared module or the like.

In the present embodiment, the first information may also be a normal signal which cannot indicate the current charge state of the second electronic device itself.

At a step 302, the first electronic device increases an output current of the first electronic device to a third output current and supplies power to the second electronic device with the third output current, when the first electronic device receives the first information.

In the present embodiment, when the first electronic device does not receive the first information, it supplies power to the second electronic device with the preset output current, for example 500 mA. When the first electronic device receives the first information, the first electronic device increases the output current supplied to the second electronic device. For example, the third output current is 1000 mA. In a preset time period, the first electronic device keeps to supply power to the second electronic device with the third output current.

At a step 303, it is determined that the second electronic device is in an abnormal charge state when the first electronic device does not receive the first information transmitted from the second electronic device in a second preset time period larger than the first preset time period.

Herein, the second electronic device transmits the first information to the first electronic device in the first strategy. That is, the second electronic device transmits the first information in every first preset time period. When the first electronic device does not receive the first information transmitted from the second electronic device in the second preset time period, it indicates that there may be a problem in the communication mechanism between the first electronic device and the second electronic device, and/or the charge state of the second electronic device itself is abnormal to result in that the second electronic device interrupts to transmit the first information to the first electronic device in every preset first time period. Then, the first electronic device may determine that the second electronic device is in the abnormal charge state.

At a step 304, a first instruction is generated and a first operation for lowering an output power consumption is performed based on the first instruction.

Herein, when the first electronic device determines that the second electronic device is in the abnormal charge state, the output power consumption is lowered by the first operation, which lowers the output current or turns off the output current directly.

With the technical solution of the embodiment of the present disclosure, it is realized that the first electronic device adjusts the output power consumption adaptively according to the charge state of the second electronic device, so that various damages to the second electronic device in the charge process are avoided effectively.

Fourth Embodiment

Figure 4:
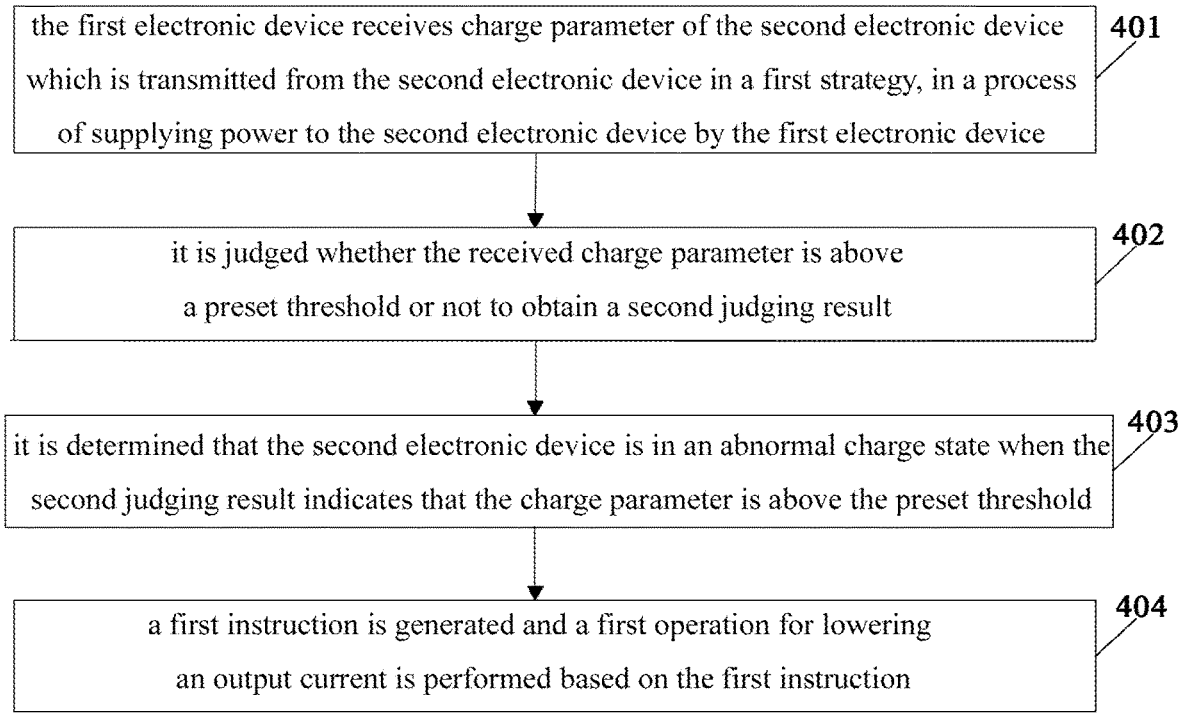
FIG. 4 is a schematic flowchart of an information processing method according to a fourth embodiment of the present disclosure.

An information processing method is provided in an embodiment of the present disclosure. The information processing method is applied to a first electronic device which is capable of communicating with a second electronic device and supplying power to the second electronic device. FIG. 4 is a schematic flowchart of an information processing method according to a fourth embodiment of the present disclosure. As shown in FIG. 4, the method comprises the following steps.

At a step 401, the first electronic device receives charge parameter of the second electronic device, which is transmitted from the second electronic device in a first strategy, in a process of supplying power to the second electronic device by the first electronic device.

In the present embodiment, the first electronic device may be a device which can charge to a second electronic device by plugging on a commercial plug, such as a charge adapter or the like. Further, the first electronic device may also be a device which can charge to the second electronic device, such as a personal computer, a notebook computer or the like. The second electronic device may be a terminal device having a charge battery such as a cell phone, a tablet, a notebook computer or the like.

The first electronic device is arranged with a power supply interface, the second electronic device is arranged with a charge interface which is connected to the power supply interface by a cable when the second electronic device is supplied power by the first electronic device; and the first electronic device and the electronic device communicate with each other by the power supply interface, the cable and the charge interface. Optionally, the power supply interface of the first electronic device and the charge interface of the second electronic device may be Universal Serial Bus (USB) interfaces, such as a Micro USB interface or a Mini USB interface.

Herein, the first electronic device and the second electronic device may communicate through the USB interface. Particularly, taking an example in which the charge interface is a Mini USB interface, the Mini USB interface has four pins corresponding to four lines of the data lines. Particularly, the four lines corresponding to the four pins bear the power (VBUS), the positive data (D+), the negative data (D−) and the ground (GND) respectively. In the charge process described in the present embodiment, the first electronic device charges the second electronic device through the VBUS in the charge interface and the VBUS line in the corresponding data line.

The first electronic device and the second electronic device may establish a communication mechanism through the VBUS. Particularly, the transmitting party may modulate the information to be transmitted into a high frequency carrier, and transmit the high frequency carrier through the VBUS. The receiving party demodulates the received high frequency carrier and obtains the information. Alternatively, the first electronic device and the second electronic device may communicate by the Tx/Rx signal through the D+ and/or D− differential line duplex UART serial port. Alternatively, the first electronic device and the second electronic device may communicate by adjusting the level configuration of D+ and/or D−. Alternatively, the first electronic device and the second electronic device may communicate through the modulation pulse. For example, five pulses are transmitted in which the former three pulses are long pulses and the latter two pulses are short pulses, that is, the three-long-two-short pulse signal indicates a preset information meaning. Alternatively, the first electronic device and the second electronic device may communicate through a wireless communication module arranged within the first electronic device and the second electronic device. The wireless communication module may be a wireless communication module such as a Bluetooth module, an infrared module or the like.

In the present embodiment, the first information may be at least one of a charge current value, a charge voltage value, a temperature value of a charge interface, or the like. When the first information is the above charge parameter, the first strategy may be that the second electronic device transmits it to the first electronic device in a preset cycle.

At a step 402, it is judged whether the received charge parameter is above a preset threshold or not to obtain a second judging result.

At a step 403, it is determined that the second electronic device is in the abnormal charge state when the second judging result indicates that the charge parameter is above the preset threshold.

Herein, the first electronic device stores the standard range of the above charge parameter itself. The standard range is the preset threshold. When the charge parameter is above the standard range, it may be determined that the second electronic device is in the abnormal charge state. When the charge parameter is in the standard range, it may be determined that the second electronic device is in the normal charge state.

At a step 404, a first instruction is generated and the output current is lowered based on the first instruction.

Herein when the first electronic device determines that the second electronic device is in the abnormal charge state, the output power consumption is lowered by the first operation. That is, the output current is lowered. In another implementation, the first electronic device may turn off the output current directly.

With the technical solution of the embodiment of the present disclosure, it is realized that the first electronic device adjusts the output power consumption adaptively according to the charge state of the second electronic device, so that various damages to the second electronic device in the charge process are avoided effectively.

Another optional embodiment based on the technical solution provided in the first embodiment is similar to the fourth embodiment, in which the first information received by the first electronic device may be a signal indicating whether the current charge parameter of the second electronic device is normal or not. The signal may be at least one of an over-current signal, an over-voltage signal, an over-temperature signal, or the like. In the fourth embodiment, the first electronic device obtains the charge parameter of the second electronic device, and judges the charge parameter to obtain the charge state of the second electronic device; while in the present embodiment, the second electronic device judges according to its charge parameter, obtains a result indicating whether its charge state is normal or not, and indicates it by a signal. The first electronic device obtains the signal indicating whether the charge to the second electronic device is normal or abnormal, determines the charge state of the second electronic device according to the acquired signal value. When the first electronic device determines that the second electronic device is in the abnormal charge state according to the acquired signal value, the operation is similar to that in the fourth embodiment, and will not be repeated here.

Fifth Embodiment

Figure 5:
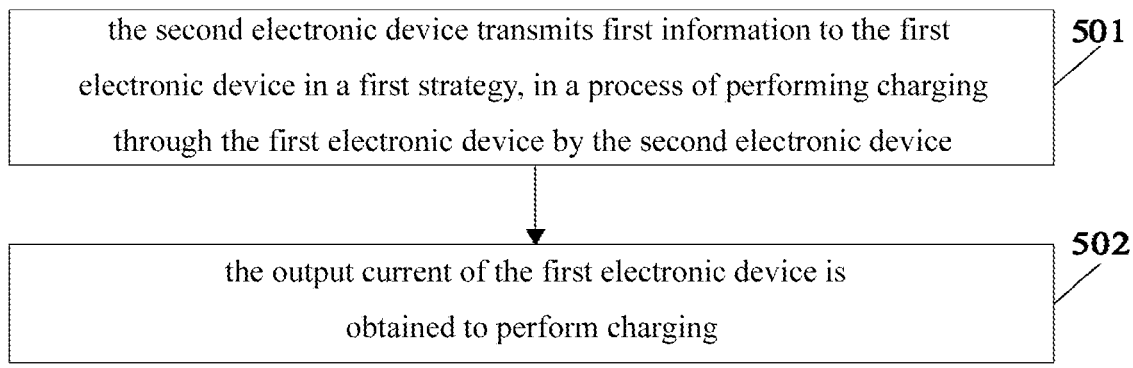
FIG. 5 is a schematic flowchart of an information processing method according to a fifth embodiment of the present disclosure.

An information processing method is provided in an embodiment of the present disclosure. The information processing method is applied to a second electronic device which is capable of communicating with a first electronic device and being charged by the first electronic device. FIG. 5 is a schematic flowchart of an information processing method according to a fifth embodiment of the present disclosure. As shown in FIG. 5, the method comprises the following steps.

At a step 501, the second electronic device transmits first information to the first electronic device in a first strategy, in a process of being charged by the first electronic device.

In the present embodiment, the second electronic device may be a terminal device having a charge battery such as a cell phone, a tablet, a notebook computer or the like. The first electronic device may be a device which can charge to a second electronic device by plugging on a commercial plug, such as a charge adapter or the like. Further, the first electronic device may also be a device which can charge to the second electronic device, such as a personal computer, a notebook computer or the like.

The first electronic device is arranged with a power supply interface, the second electronic device is arranged with a charge interface which is connected to the power supply interface by a cable when the second electronic device is supplied power by the first electronic device; and the first electronic device and the electronic device communicate with each other by the power supply interface, the cable and the charge interface. Optionally, the power supply interface of the first electronic device and the charge interface of the second electronic device may be Universal Serial Bus (USB) interfaces, such as a Micro USB interface or a Mini USB interface.

Herein, the first electronic device and the second electronic device may communicate through the USB interface. Particularly, taking an example in which the charge interface is a Mini USB interface, the Mini USB interface has four pins corresponding to four lines of the data lines. Particularly, the four lines corresponding to the four pins bear the power (VBUS), the positive data (D+), the negative data (D−) and the ground (GND) respectively. In the charge process described in the present embodiment, the first electronic device charges the second electronic device through the VBUS in the charge interface and the VBUS line in the corresponding data line.

The first electronic device and the second electronic device may establish a communication mechanism through the VBUS. Particularly, the transmitting party may modulate the information to be transmitted into a high frequency carrier, and transmit the high frequency carrier through the VBUS. The receiving party demodulates the received high frequency carrier and obtains the information. Alternatively, the first electronic device and the second electronic device may communicate by the Tx/Rx signal through the D+ and/or D− differential line duplex UART serial port. Alternatively, the first electronic device and the second electronic device may communicate by adjusting the level configuration of D+ and/or D−. Alternatively, the first electronic device and the second electronic device may communicate through the modulation pulse. For example, five pulses are transmitted in which the former three pulses are long pulses and the latter two pulses are short pulses, that is, the three-long-two-short pulse signal indicates a preset information meaning. Alternatively, the first electronic device and the second electronic device may communicate through a wireless communication module arranged within the first electronic device and the second electronic device. The wireless communication module may be a wireless communication module such as a Bluetooth module, an infrared module or the like.

In the present embodiment, the first information may be information indicating whether the current charge state of the second electronic device is normal or not. Particularly, the first information may be a current charge parameter of the second electronic device, which may be at least one of a charge current value, a charge voltage value, a temperature value of a charge interface, or the like. When the first information is the above charge parameter, the first strategy may be that the second electronic device transmits it to the first electronic device in a preset cycle. The second electronic device may obtain the above parameter by its current sensor, voltage sensor or temperature sensor.

The first information may also be a signal indicated by the current charge parameter of the second electronic device, which may be at least one of an over-current signal, an over-voltage signal, an over-temperature signal, or the like. When the first information is the above signal, the first strategy may be that the second electronic device transmits the signal to the first electronic device immediately when it generates the above signal.

In another implementation, the first information may be a normal signal which cannot indicate the current charge state of the second electronic device itself. In this case, the first strategy is that the second electronic device transmits the first information to the first electronic device in every first preset time period. The first electronic device may judge the current charge state of the second electronic device by judging whether the first information is received or not in the preset first time period.

At a step 502, the output current of the first electronic device is obtained to perform charging.

With the technical solution of the embodiment of the present disclosure, it is realized that the second electronic device transmits the first information to the first electronic device, so that the first electronic device can adjust the output power consumption adaptively according to the charge state of the second electronic device, so that various damages to the second electronic device in the charge process are avoided effectively.

Sixth Embodiment

Figure 6:
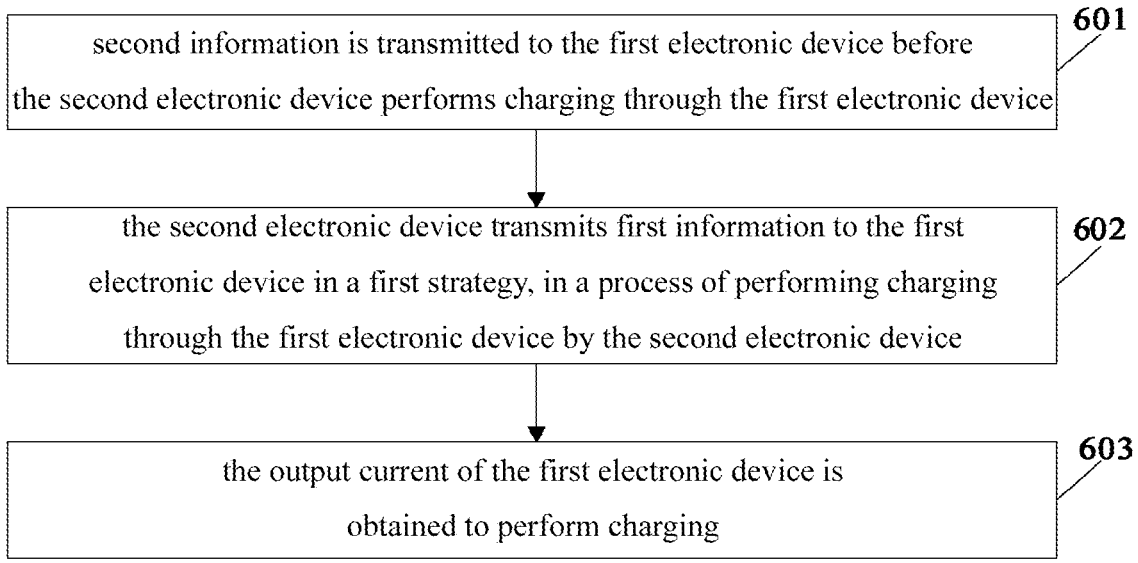
FIG. 6 is a schematic flowchart of an information processing method according to a sixth embodiment of the present disclosure.

An information processing method is provided in an embodiment of the present disclosure. The information processing method is applied to a second electronic device which is capable of communicating with a first electronic device and being charged through the first electronic device. FIG. 6 is a schematic flowchart of an information processing method according to a sixth embodiment of the present disclosure. As shown in FIG. 6, the method comprises the following steps.

At a step 601, second information is transmitted to the first electronic device from the second electronic device before the second electronic device performs charging through the first electronic device, the second information indicating a second parameter of the second electronic device.

In the present embodiment, the second electronic device may be a terminal device having a charge battery such as a cell phone, a tablet, a notebook computer or the like. The first electronic device may be a device which can charge to a second electronic device by plugging on a commercial plug, such as a charge adapter or the like. Further, the first electronic device may also be a device which can charge to the second electronic device, such as a personal computer, a notebook computer or the like.

The first electronic device is arranged with a power supply interface, the second electronic device is arranged with a charge interface which is connected to the power supply interface by a cable when the second electronic device is supplied power by the first electronic device; and the first electronic device and the electronic device communicate with each other by the power supply interface, the cable and the charge interface. Optionally, the power supply interface of the first electronic device and the charge interface of the second electronic device may be Universal Serial Bus (USB) interfaces, such as a Micro USB interface or a Mini USB interface.

Herein, the first electronic device and the second electronic device may communicate through the USB interface. Particularly, taking an example in which the charge interface is a Mini USB interface, the Mini USB interface has four pins corresponding to four lines of the data lines. Particularly, the four lines corresponding to the four pins bear the power (VBUS), the positive data (D+), the negative data (D−) and the ground (GND) respectively. In the charge process described in the present embodiment, the first electronic device charges the second electronic device through the VBUS in the charge interface and the VBUS line in the corresponding data line.

The first electronic device and the second electronic device may establish a communication mechanism through the VBUS. Particularly, the transmitting party may modulate the information to be transmitted into a high frequency carrier, and transmit the high frequency carrier through the VBUS. The receiving party demodulates the received high frequency carrier and obtains the information. Alternatively, the first electronic device and the second electronic device may communicate by the Tx/Rx signal through the D+ and/or D− differential line duplex UART serial port. Alternatively, the first electronic device and the second electronic device may communicate by adjusting the level configuration of D+ and/or D−. Alternatively, the first electronic device and the second electronic device may communicate through the modulation pulse. For example, five pulses are transmitted in which the former three pulses are long pulses and the latter two pulses are short pulses, that is, the three-long-two-short pulse signal indicates a preset information meaning. Alternatively, the first electronic device and the second electronic device may communicate through a wireless communication module arranged within the first electronic device and the second electronic device. The wireless communication module may be a wireless communication module such as a Bluetooth module, an infrared module or the like.

The second parameter may be an identification, a manufacture name or a type of the second electronic device. When the first electronic device and the second electronic device are connected through the power supply interface, the cable and the charge interface respectively, the second electronic device transmits the second information to the first electronic device via the above communication mechanism.

At a step 602, the second electronic device transmits first information to the first electronic device in a first strategy, in a process of being charged by the first electronic device.

In the present embodiment, the first information may be information indicating whether the current charge state of the second electronic device is normal or not. Particularly, the first information may be a current charge parameter of the second electronic device, which may be at least one of a charge current value, a charge voltage value, a temperature value of a charge interface, or the like. When the first information is the above charge parameter, the first strategy may be that the second electronic device transmits it to the first electronic device in a preset cycle. The first information may also be a signal indicated by the current charge parameter of the second electronic device, which may be at least one of an over-current signal, an over-voltage signal, an over-temperature signal, or the like. When the first information is the above signal, the first strategy may be that the second electronic device transmits the signal to the first electronic device immediately when it generates the above signal.

At a step 603, the output current of the first electronic device is obtained to perform charging.

With the technical solution of the embodiment of the present disclosure, it is realized that the second electronic device transmits the first information to the first electronic device, so that the first electronic device can adjust the output power consumption adaptively according to the charge state of the second electronic device, so that various damages to the second electronic device in the charge process are avoided effectively.

Seventh Embodiment

Figure 7:
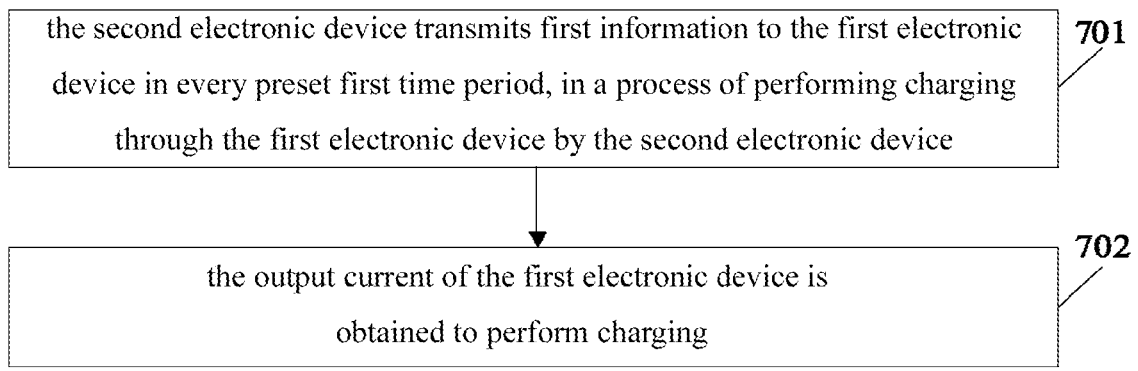
FIG. 7 is a schematic flowchart of an information processing method according to a seventh embodiment of the present disclosure.

An information processing method is provided in an embodiment of the present disclosure. The information processing method is applied to a second electronic device which is capable of communicating with a first electronic device and being charged by the first electronic device. FIG. 7 is a schematic flowchart of an information processing method according to a seventh embodiment of the present disclosure. As shown in FIG. 7, the method comprises the following steps.

At a step 701, the second electronic device transmits first information to the first electronic device in every preset first time period, in a process of being charged by the first electronic device.

In the present embodiment, the second electronic device may be a terminal device having a charge battery such as a cell phone, a tablet, a notebook computer or the like. The first electronic device may be a device which can charge to a second electronic device by plugging on a commercial plug, such as a charge adapter or the like. Further, the first electronic device may also be a device which can charge to the second electronic device, such as a personal computer, a notebook computer or the like.

The first electronic device is arranged with a power supply interface, the second electronic device is arranged with a charge interface which is connected to the power supply interface by a cable when the second electronic device is supplied power by the first electronic device; and the first electronic device and the electronic device communicate with each other by the power supply interface, the cable and the charge interface. Optionally, the power supply interface of the first electronic device and the charge interface of the second electronic device may be Universal Serial Bus (USB) interfaces, such as a Micro USB interface or a Mini USB interface.

Herein, the first electronic device and the second electronic device may communicate through the USB interface. Particularly, taking an example in which the charge interface is a Mini USB interface, the Mini USB interface has four pins corresponding to four lines of the data lines. Particularly, the four lines corresponding to the four pins bear the power (VBUS), the positive data (D+), the negative data (D−) and the ground (GND) respectively. In the charge process described in the present embodiment, the first electronic device charges the second electronic device through the VBUS in the charge interface and the VBUS line in the corresponding data line.

The first electronic device and the second electronic device may establish a communication mechanism through the VBUS. Particularly, the transmitting party may modulate the information to be transmitted into a high frequency carrier, and transmit the high frequency carrier through the VBUS. The receiving party demodulates the received high frequency carrier and obtains the information. Alternatively, the first electronic device and the second electronic device may communicate by the Tx/Rx signal through the D+ and/or D− differential line duplex UART serial port. Alternatively, the first electronic device and the second electronic device may communicate by adjusting the level configuration of D+ and/or D−. Alternatively, the first electronic device and the second electronic device may communicate through the modulation pulse. For example, five pulses are transmitted in which the former three pulses are long pulses and the latter two pulses are short pulses, that is, the three-long-two-short pulse signal indicates a preset information meaning. Alternatively, the first electronic device and the second electronic device may communicate through a wireless communication module arranged within the first electronic device and the second electronic device. The wireless communication module may be a wireless communication module such as a Bluetooth module, an infrared module or the like.

In the present embodiment, the first information may be a normal signal which cannot indicate the current charge state of the second electronic device itself. In this case, the first strategy is that the second electronic device transmits the first information to the first electronic device in every first preset time period. When the second electronic device transmits the first information to the first electronic device in every first preset time period, it indicates that the communication mechanism between the first electronic device and the second electronic device is normal, and the charge state of the second electronic device is normal. When the second electronic device does not transmit the first information to the first electronic device in the second preset time period, it indicates that there is a problem in the communication mechanism between the first electronic device and the second electronic device, and/or the charge state of the second electronic device itself is abnormal to result in that the second electronic device interrupts to transmit the first information to the first electronic device in every first preset time period.

At a step 702, the output current of the first electronic device is obtained to perform charging.

With the technical solution of the embodiment of the present disclosure, it is realized that the second electronic device transmits the first information to the first electronic device, so that the first electronic device can adjust the output power consumption adaptively according to the charge state of the second electronic device, so that various damages to the second electronic device in the charge process are avoided effectively.

Eighth Embodiment

Figure 8:
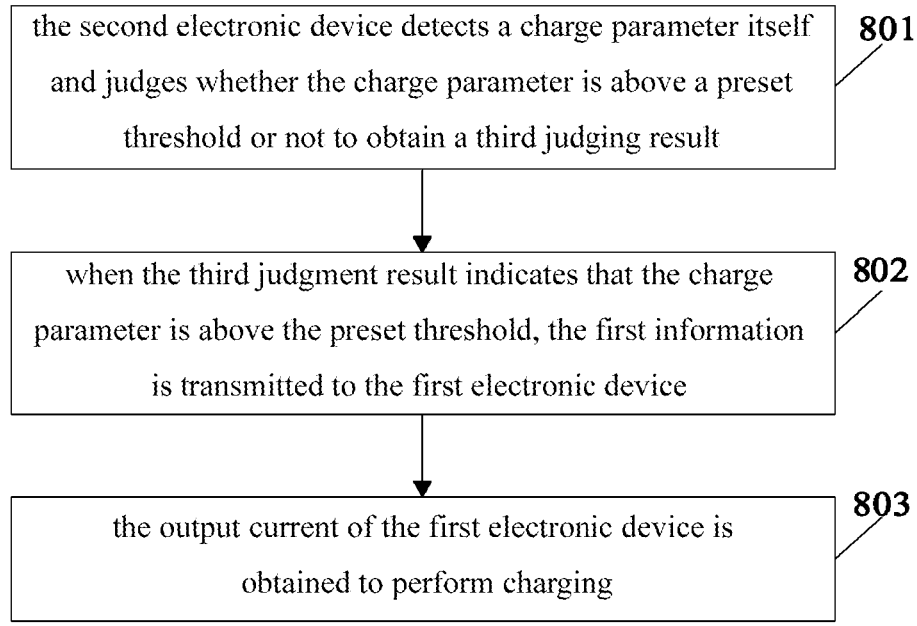
FIG. 8 is a schematic flowchart of an information processing method according to an eighth embodiment of the present disclosure.

An information processing method is provided in an embodiment of the present disclosure. The information processing method is applied to a second electronic device which is capable of communicating with a first electronic device and being charged by the first electronic device. FIG. 8 is a schematic flowchart of an information processing method according to an eighth embodiment of the present disclosure. As shown in FIG. 8, the method comprises the following steps.

At a step 801, the second electronic device detects its charge parameter itself and judges whether the charge parameter is above a preset threshold to obtain a third judging result.

In the present embodiment, the second electronic device may be a terminal device having a charge battery such as a cell phone, a tablet, a notebook computer or the like. The first electronic device may be a device which can charge to a second electronic device by plugging on a commercial plug, such as a charge adapter or the like. Further, the first electronic device may also be a device which can charge to the second electronic device, such as a personal computer, a notebook computer or the like.

Herein, the charge parameter may be at least one of a charge current value, a charge voltage value, a charge interface temperature value or the like. The second electronic device may obtain the above charge parameter by its current sensor, voltage sensor or the temperature sensor.

The second electronic device has stored therein a standard range of the above charge parameter which is the preset threshold. When the charge parameter is not in the standard range, the second electronic device may determine that it's in an abnormal charge state. When the charge parameter is in the standard range, the second electronic device may determine that it's in a normal charge state.

At a step 802, when the third judgment result is that the charge parameter is above the preset threshold, the first information is transmitted to the first electronic device.

The first electronic device is arranged with a power supply interface, the second electronic device is arranged with a charge interface which is connected to the power supply interface by a cable when the second electronic device is supplied power by the first electronic device; and the first electronic device and the electronic device communicate with each other by the power supply interface, the cable and the charge interface. Optionally, the power supply interface of the first electronic device and the charge interface of the second electronic device may be Universal Serial Bus (USB) interfaces, such as a Micro USB interface or a Mini USB interface.

Herein, the first electronic device and the second electronic device may communicate through the USB interface. Particularly, taking an example in which the charge interface is a Mini USB interface, the Mini USB interface has four pins corresponding to four lines of the data lines. Particularly, the four lines corresponding to the four pins bear the power (VBUS), the positive data (D+), the negative data (D−) and the ground (GND) respectively. In the charge process described in the present embodiment, the first electronic device charges the second electronic device through the VBUS in the charge interface and the VBUS line in the corresponding data line.

The first electronic device and the second electronic device may establish a communication mechanism through the VBUS. Particularly, the transmitting party may modulate the information to be transmitted into a high frequency carrier, and transmit the high frequency carrier through the VBUS. The receiving party demodulates the received high frequency carrier and obtains the information. Alternatively, the first electronic device and the second electronic device may communicate by the Tx/Rx signal through the D+ and/or D− differential line duplex UART serial port. Alternatively, the first electronic device and the second electronic device may communicate by adjusting the level configuration of D+ and/or D−. Alternatively, the first electronic device and the second electronic device may communicate through the modulation pulse. For example, five pulses are transmitted in which the former three pulses are long pulses and the latter two pulses are short pulses, that is, the three-long-two-short pulse signal indicates a preset information meaning. Alternatively, the first electronic device and the second electronic device may communicate through a wireless communication module arranged within the first electronic device and the second electronic device. The wireless communication module may be a wireless communication module such as a Bluetooth module, an infrared module or the like.

Herein, when the charge parameter is above the preset threshold, it indicates that the second electronic device is in the abnormal charge state. When the first information is the signal indicated by the current charge parameter such as the current signal, the voltage signal or the temperature signal, of the second electronic device, the current charge state of the second electronic device may be determined by the relationship between the preset signal value and the charge state. For example, it is preset that the voltage signal value of 0 is a signal value corresponding to the normal voltage state, and the voltage signal value of 1 is a signal value corresponding to the abnormal voltage state. When the first information is the current signal or the temperature signal, the current state or the temperature state can be determined with reference to the way of determining the voltage state based on the voltage signal.

At a step 803, the output current of the first electronic device is obtained to perform charging.

With the technical solution of the embodiment of the present disclosure, it is realized that the second electronic device transmits the first information to the first electronic device, so that the first electronic device can adjust the output power consumption adaptively according to the charge state of the second electronic device, so that various damages to the second electronic device in the charge process are avoided effectively.

Ninth Embodiment

Figure 9:
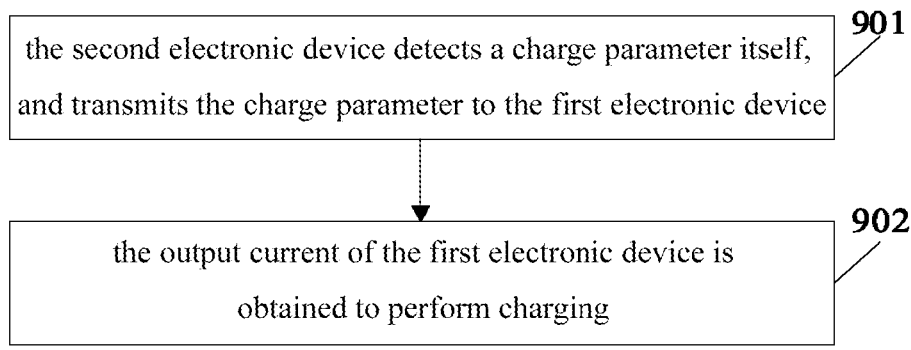
FIG. 9 is a schematic flowchart of an information processing method according to a ninth embodiment of the present disclosure.

An information processing method is provided in an embodiment of the present disclosure. The information processing method is applied to a second electronic device which is capable of communicating with a first electronic device and being charged by the first electronic device. FIG. 9 is a schematic flowchart of an information processing method according to a ninth embodiment of the present disclosure. As shown in FIG. 9, the method comprises the following steps.

At a step 901, the second electronic device detects its charge parameter, and transmits the charge parameter to the first electronic device.

In the present embodiment, the second electronic device may be a terminal device having a charge battery such as a cell phone, a tablet, a notebook computer or the like. The first electronic device may be a device which can charge to a second electronic device by plugging on a commercial plug, such as a charge adapter or the like. Further, the first electronic device may also be a device which can charge to the second electronic device, such as a personal computer, a notebook computer or the like.

The first electronic device is arranged with a power supply interface, the second electronic device is arranged with a charge interface which is connected to the power supply interface by a cable when the second electronic device is supplied power by the first electronic device; and the first electronic device and the electronic device communicate with each other by the power supply interface, the cable and the charge interface. Optionally, the power supply interface of the first electronic device and the charge interface of the second electronic device may be Universal Serial Bus (USB) interfaces, such as a Micro USB interface or a Mini USB interface.

Herein, the first electronic device and the second electronic device may communicate through the USB interface. Particularly, taking an example in which the charge interface is a Mini USB interface, the Mini USB interface has four pins corresponding to four lines of the data lines. Particularly, the four lines corresponding to the four pins bear the power (VBUS), the positive data (D+), the negative data (D−) and the ground (GND) respectively. In the charge process described in the present embodiment, the first electronic device charges the second electronic device through the VBUS in the charge interface and the VBUS line in the corresponding data line.

The first electronic device and the second electronic device may establish a communication mechanism through the VBUS. Particularly, the transmitting party may modulate the information to be transmitted into a high frequency carrier, and transmit the high frequency carrier through the VBUS. The receiving party demodulates the received high frequency carrier and obtains the information. Alternatively, the first electronic device and the second electronic device may communicate by the Tx/Rx signal through the D+ and/or D− differential line duplex UART serial port. Alternatively, the first electronic device and the second electronic device may communicate by adjusting the level configuration of D+ and/or D−. Alternatively, the first electronic device and the second electronic device may communicate through the modulation pulse. For example, five pulses are transmitted in which the former three pulses are long pulses and the latter two pulses are short pulses, that is, the three-long-two-short pulse signal indicates a preset information meaning. Alternatively, the first electronic device and the second electronic device may communicate through a wireless communication module arranged within the first electronic device and the second electronic device. The wireless communication module may be a wireless communication module such as a Bluetooth module, an infrared module or the like.

Herein, the charge parameter may be at least one of a charge current value, a charge voltage value, a temperature value of a charge interface, or the like. The second electronic device may obtain the above charge parameter by its current sensor, voltage sensor or the temperature sensor.

The second electronic device transmits the charge parameter to the first electronic device, and the electronic device judges according to the charge parameter to determine the current charge stage of the second electronic device.

At a step 902, the output current of the first electronic device is obtained to perform charging.

With the technical solution of the embodiment of the present disclosure, it is realized that the second electronic device transmits the first information to the first electronic device, so that the first electronic device can adjust the output power consumption adaptively according to the charge state of the second electronic device, so that various damages to the second electronic device in the charge process are avoided effectively.

Tenth Embodiment

Figure 10:
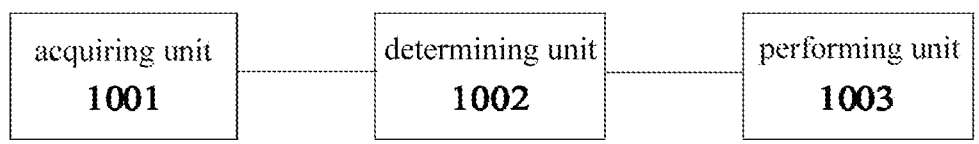
FIG. 10 is a schematic diagram of a structure of a first electronic device according to an embodiment of the present disclosure.

An electronic device as a first electronic device is provided in an embodiment of the present disclosure. FIG. 10 is a schematic diagram of a structure of a first electronic device according to an embodiment of the present disclosure. As shown in FIG. 10, the first electronic device comprises an acquiring unit 1001, a determining unit 1002 and a performing unit 1003.

The acquiring unit 1001 receives first information transmitted from the second electronic device in a first strategy and transmits the first information to the determining unit 1002, in a process of supplying power to the second electronic device by the first electronic device.

The determining unit 1002 judges a charge state of the second electronic device according to the first information.

The performing unit 1003 generates a first instruction when the determining unit 1002 determines that the second electronic device is in an abnormal charge state; and performs a first operation for lowering an output power consumption, based on the first instruction.

Those skilled in the art should understand that the functions of the respective processing units in the first electronic device according to the embodiment of the present disclosure may be understood with reference to the related description of the information processing method as described above. The respective processing units in the first electronic device according to the embodiment of the present disclosure may be realized by analog circuits realizing the functions described in the embodiment of the present disclosure, or may be realized by executing software with the function described in the embodiment of the present disclosure on a smart terminal.

Eleventh Embodiment

An electronic device as a first electronic device is provided in an embodiment of the present disclosure. As shown in FIG. 10, the first electronic device comprises an acquiring unit 1001, a determining unit 1002 and a performing unit 1003.

The acquiring unit 1001 acquires second information of the second electronic device, before supplying power to the second electronic device by the first electronic device, and transmitting the second information to the determining unit 1002; the second information indicating a second parameter of the second electronic device; and further receives first information transmitted from the second electronic device in a first strategy and transmits the first information to the determining unit 1002, in a process of supplying power to the second electronic device by the first electronic device.

The determining unit 1002 judges whether the second parameter matches with a first parameter stored itself and obtains a first judging result; and further judges a charge state of the second electronic device according to the first information.

Particularly, the performing unit 1003 supplies power to the second electronic device in a first preset way when the first judging result obtained by the determining unit 1002 indicates that the second parameter doesn't match with the first parameter, and further generates a first instruction when the determining unit 1002 determines that the second electronic device is in an abnormal charge state; and performs a first operation for lowering an output power consumption based on the first instruction.

Particularly, the performing unit 1003 supplies power to the second electronic device in a first preset way, in a manner of: lowering an output current and supplying power to the second electronic device with the lowered output current; or rendering prompt information for an indication of supplying power to the second electronic device with a first output current or a second output current, the first output current being larger than the second output current; determining an output current according to an selection operation by a user, and supplying power to the second electronic device with the selected output current; or stopping supplying power to the second electronic device.

Those skilled in the art should understand that the functions of the respective processing units in the first electronic device according to the embodiment of the present disclosure may be understood with reference to the related description of the information processing method as described above. The respective processing units in the first electronic device according to the embodiment of the present disclosure may be realized by analog circuits realizing the functions described in the embodiment of the present disclosure, or may be realized by executing software with the function described in the embodiment of the present disclosure on a smart terminal.

Twelfth Embodiment

An electronic device as a first electronic device is provided in an embodiment of the present disclosure. As shown in FIG. 10, the first electronic device comprises an acquiring unit 1001, a determining unit 1002 and a performing unit 1003.

The acquiring unit 1001 receives first information transmitted from the second electronic device in every preset first time period, in a process of supplying power to the second electronic device by the first electronic device.

The determining unit 1002 determines that the second electronic device is in a normal charge state when the acquiring unit 1001 receives the first information transmitted from the first acquiring unit in every first preset time period from the second electronic device, and further determines that the second electronic device is in an abnormal charge state when the acquiring unit 1001 does not receive the first information transmitted from the second electronic device in a second preset time period larger than the first preset time period.

The performing unit 1003 increases an output current to a third output current when the determining unit 1002 determines that the second electronic device is in the normal charge state, and supplies power to the second electronic device with the third output current, and further generates a first instruction when the determining unit 1002 determines that the second electronic device is in an abnormal charge state; and performs a first operation for lowering an output power consumption, based on the first instruction.

Those skilled in the art should understand that the functions of the respective processing units in the first electronic device according to the embodiment of the present disclosure may be understood with reference to the related description of the information processing method as described above. The respective processing units in the first electronic device according to the embodiment of the present disclosure may be realized by analog circuits realizing the functions described in the embodiment of the present disclosure, or may be realized by executing software with the function described in the embodiment of the present disclosure on a smart terminal.

Thirteenth Embodiment

An electronic device as a first electronic device is provided in an embodiment of the present disclosure. As shown in FIG. 10, the first electronic device comprises an acquiring unit 1001, a determining unit 1002 and a performing unit 1003.

The acquiring unit 1001 receives charge parameter transmitted from the second electronic device in a first strategy and transmits the charge parameter to the determining unit 1002, in a process of supplying power to the second electronic device by the first electronic device.

The determining unit 1002 judges whether the received charge parameter is above a preset threshold or not to obtain a second judging result.

The performing unit 1003 determines that the second electronic device is in the abnormal charge state when the second judging result obtained by the determining unit 1002 indicates that the charge parameter is above the preset threshold; generates a first instruction, and performs a first operation for lowering an output power consumption, based on the first instruction.

Those skilled in the art should understand that the functions of the respective processing units in the first electronic device according to the embodiment of the present disclosure may be understood with reference to the related description of the information processing method as described above. The respective processing units in the first electronic device according to the embodiment of the present disclosure may be realized by analog circuits realizing the functions described in the embodiment of the present disclosure, or may be realized by executing software with the function described in the embodiment of the present disclosure on a smart terminal.

In the tenth embodiment to the thirteenth embodiment of the present disclosure, the first electronic device may be a device which can charge to a second electronic device by plugging on a commercial plug, such as a charge adapter or the like. Further, the first electronic device may also be a device which can charge to the second electronic device, such as a personal computer, a notebook computer or the like. The determining unit 1002 and the performing unit 1003 in the first electronic device may be realized by a CPU (Central Processing Unit), a DSP (Digital Signal Processor) or a FPGA (Field Programmable Gate Array) in the first electronic device in practice. The acquiring unit 1001 in the first electronic device may be realized by a USB interface or a wireless communication module such as a Bluetooth module, an infrared module, or the like in practice.

Fourteenth Embodiment

Figure 11:
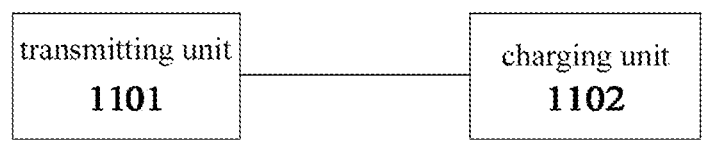
FIG. 11 is a schematic diagram of a first kind of a structure of a second electronic device according to an embodiment of the present disclosure.

An electronic device as a second electronic device is provided in an embodiment of the present disclosure. FIG. 11 is a schematic diagram of a first kind of a structure of a second electronic device according to an embodiment of the present disclosure. As shown in FIG. 11, the second electronic device comprises a transmitting unit 1101 and a charging unit 1102.

The transmitting unit 1101 transmits first information to the first electronic device in a first strategy, in a process of the second electronic device being charged by the first electronic device.

The charging unit 1102 obtains an output current from the first electronic device and performs charging.

Those skilled in the art should understand that the functions of the respective processing units in the second electronic device according to the embodiment of the present disclosure may be understood with reference to the related description of the information processing method as described above. The respective processing units in the second electronic device according to the embodiment of the present disclosure may be realized by analog circuits realizing the functions described in the embodiment of the present disclosure, or may be realized by executing software with the function described in the embodiment of the present disclosure on a smart terminal.

Fifteenth Embodiment

An electronic device as a second electronic device is provided in an embodiment of the present disclosure. As shown in FIG. 11, the second electronic device comprises a transmitting unit 1101 and a charging unit 1102.

The transmitting unit 1101 transmits second information to the first electronic device before the second electronic device performs charging through the first electronic device, the second information indicating a second parameter of the second electronic device, and further transmits first information to the first electronic device in a first strategy, in a process of the second electronic device being charged by the first electronic device.

The charging unit 1102 obtains an output current from the first electronic device and performing charging.

Those skilled in the art should understand that the functions of the respective processing units in the second electronic device according to the embodiment of the present disclosure may be understood with reference to the related description of the information processing method as described above. The respective processing units in the second electronic device according to the embodiment of the present disclosure may be realized by analog circuits realizing the functions described in the embodiment of the present disclosure, or may be realized by executing software with the function described in the embodiment of the present disclosure on a smart terminal.

Sixteenth Embodiment

An electronic device as a second electronic device is provided in an embodiment of the present disclosure. As shown in FIG. 11, the second electronic device comprises a transmitting unit 1101 and a charging unit 1102.

The transmitting unit 1101 transmits first information to the first electronic device in every first preset time period, in a process of the second electronic device being charged by the first electronic device.

The charging unit 1102 obtains an output current from the first electronic device and performs charging.

Those skilled in the art should understand that the functions of the respective processing units in the second electronic device according to the embodiment of the present disclosure may be understood with reference to the related description of the information processing method as described above. The respective processing units in the second electronic device according to the embodiment of the present disclosure may be realized by analog circuits realizing the functions described in the embodiment of the present disclosure, or may be realized by executing software with the function described in the embodiment of the present disclosure on a smart terminal.

Seventeenth Embodiment

Figure 12:
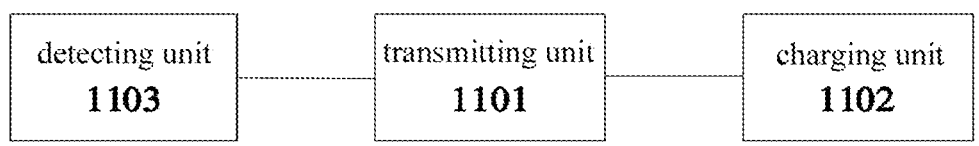
FIG. 12 is a schematic diagram of a second kind of a structure of a second electronic device according to an embodiment of the present disclosure.

An electronic device as a second electronic device is provided in an embodiment of the present disclosure. FIG. 12 is a schematic diagram of a second kind of a structure of a second electronic device according to an embodiment of the present disclosure. As shown in FIG. 12, the second electronic device comprises a detecting unit 1103, a transmitting unit 1101 and a charging unit 1102.

The detecting unit 1103 detects its charge parameter and judges whether the charge parameter is above a preset threshold to obtain a third judging result, in a process of the second electronic device being charged by the first electronic device.

The transmitting unit 1101 transmits the first information to the first electronic device when the third judging result obtained by the detecting unit 1103 indicates that the charge parameter is above the preset threshold.

The charging unit 1102 obtains an output current from the first electronic device and performs charging.

Those skilled in the art should understand that the functions of the respective processing units in the second electronic device according to the embodiment of the present disclosure may be understood with reference to the related description of the information processing method as described above. The respective processing units in the second electronic device according to the embodiment of the present disclosure may be realized by analog circuits realizing the functions described in the embodiment of the present disclosure, or may be realized by executing software with the function described in the embodiment of the present disclosure on a smart terminal.

Eighteenth Embodiment

An electronic device as a second electronic device is provided in an embodiment of the present disclosure. As shown in FIG. 12, the second electronic device comprises a detecting unit 1103, a transmitting unit 1101 and a charging unit 1102.

The detecting unit 1103 detects its charge parameter, in a process of being charged by the first electronic device.

The transmitting unit 1101 further transmits the charge parameter obtained by the detecting unit 1103, to the first electronic device.

The charging unit 1102 obtains an output current from the first electronic device and performs charging.

Those skilled in the art should understand that the functions of the respective processing units in the second electronic device according to the embodiment of the present disclosure may be understood with reference to the related description of the information processing method as described above. The respective processing units in the second electronic device according to the embodiment of the present disclosure may be realized by analog circuits realizing the functions described in the embodiment of the present disclosure, or may be realized by executing software with the function described in the embodiment of the present disclosure on a smart terminal.

In the fourteenth embodiment to the eighteenth embodiment of the present disclosure, the second electronic device may be a terminal device having a charge battery such as a cell phone, a tablet, a notebook computer or the like. The transmitting unit 1101 in the second electronic device may be realized by a USB interface or a wireless communication module such as a Bluetooth module, an infrared module, or the like in the second electronic device in practice. The charge unit 1102 in the second electronic device may be realized by a charge interface such as a USB interface in combination with a charge battery in the second electronic device in practice.

Those skilled in the art may recognize that the embodiments of the present disclosure may be provided as the method, the device or the computer program product. Therefore, the present disclosure may adopt a form of a hardware embodiment, a software embodiment, or an embodiment combining software with hardware. Also, the present disclosure may adopt a form of one or more computer program product implemented on a computer usable storage medium, which includes, but not limited to, a magnetic storage and an optical storage or the like, embodied with computer usable program code therein.

The disclosure is described with reference to flowchart illustrations and/or block diagrams of methods, apparatus and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The above is only some embodiments of the present disclosure, and is not intended to limit the protection scope of the present disclosure thereto.

The invention claimed is:

1. A method of charging an electronic device which transmits first information to a charger at a preset time period, the method comprising:
   a charger receiving first information from the electronic device, wherein the charger has a first parameter associated therewith;
   the charger determining a charge state of the electronic device by determining whether the first information is received or not in the preset time period and generating a first instruction in response to an abnormal charge state of the electronic device, wherein the abnormal charge state is determined by a preset signal value indicated by a current charge parameter of the electronic device;
   the charger adjusting lower supplied to the electronic device based on the first instruction;
   the charger acquiring second information of the electronic device before supplying power to the electronic device, the second information indicating a second parameter of the electronic device and the second parameter comprises an identification, a manufacture name, and/or a type of the electronic device;
   the charger determining whether the second parameter matches with the first parameter of the charger; and
   the charger supplying power to the electronic device in a preset manner in response to the second parameter mismatching the first parameter,
   wherein the preset manner comprises:
      providing notifying information to indicate that the charger is supplying power to the electronic device with a first output current or a second output current, the first output current being greater than the second output current;
      determining which of the first output current and the second output current is supplied to the electronic device by the charger according to a selection operation by a user; and
      supplying power to the electronic device with the first output current or the second output current selected by the user.

2. The method of claim 1, further comprising the charger increasing the power supplied to the electronic device in response to receiving the first information by the charger.

3. The method of claim 2, wherein the charge state of the electronic device is determined to be abnormal in response to not receiving the first information by the charger from the electronic device within the preset time period.

4. The method of claim 1, wherein the first information is a charge parameter of the electronic device, and determining whether the charge state of the electronic device is abnormal comprises:
   judging whether the received charge parameter is above a preset threshold; and
   determining that the charge state of the electronic device is abnormal in response to the charge parameter being above the preset threshold.

5. The method of claim 1, wherein the charger adjusting the power supplied to the electronic device comprises the charger lowering an output current and supplying the lowered output current to the electronic device.

6. A charger comprising:
   an acquiring unit configured to receive first information from an electronic device which transmits the first information to a charger at a preset time period, wherein the charger has a first parameter associated therewith;
   a processor configured to receive the first information from the acquiring unit and to determine a charge state of the electronic device by determining whether the first information is received or not in the preset time period; and
   the processor is further configured to adjust power supplied to the electronic device in response to an abnormal charge state of the electronic device determined by the processor, wherein the abnormal charge state is determined by a preset signal value indicated by a current charge parameter of the electronic device;
   wherein the acquiring unit is further operative to acquire second information of the electronic device, before supplying power to the electronic device, the second information indicating a second parameter of the electronic device and the second parameter comprises an identification, a manufacture name, and/or a type of the electronic device;
   the processor is further operative to determine whether the second parameter matches with the first parameter of the charger; and
   the processor is further operative to supply power to the electronic device in a preset manner in response to the second parameter mismatching with the first parameter; and
   wherein the processor is further operative to supply power to the electronic device in the preset manner that comprises;
      providing notifying information to indicate that the charger is supplying power to the electronic device with a first output current or a second output current, the first output current being greater than the second output current;
      determining which of the first output current and the second output current is supplied to the electronic device by the charger according to a selection operation by a user; and supplying power to the electronic device with the first output current or the second output current selected by the user.

7. The charger of claim 6, wherein
the processor is operative to determine that the electronic device is in a normal charge state in response to receiving the first information by the acquiring unit from the electronic device at the preset time period; and
the processor is operative to increase an output current to the electronic device response to a normal charge state of the electronic device determined by the processor.

8. The charger of claim 7, wherein the processor is further operative to determine that the electronic device is in an abnormal charge state in response to not receiving the first information by the acquiring unit from the electronic device within the preset time period.

9. The charger of claim 6, wherein the first information is a charge parameter of the electronic device,
the processor is operative to judge whether the received charge parameter received by the acquiring unit is above a preset threshold; and
the processor is operative to determine that the electronic device is in the abnormal charge state in response to the charge parameter being above the preset threshold.

10. The charger of claim 6, wherein the processor is operative to lower an output current o the electronic device in response to an abnormal charge state of the electronic device determined by the processor.

11. An electronic device, comprising:
a transmitting unit configured to transmit a first information to a charger at a preset time period; and
a charging unit configured to obtain power supplied from the charger for charging, wherein the charger has a first parameter associated there therewith,
wherein the transmitting unit is operative to transmit second information to the charger before the electronic device is charged by the charger, the second information indicating a second parameter of the electronic device and the second parameter comprises an identification, a manufacture name, and/or a type of the electronic device, and so that the charger supplies power to the electronic device in a preset manner in response to the second parameter mismatching the first parameter;
wherein the preset manner comprises:
providing notifying information to indicate that the charger is supplying power to the electronic device with a first output current or a second output current, the first output current being greater than the second output current;
determining which of the first output current or the second output current is supplied to the electronic device by the charger according to a selection operation by a user; and
supplying power to the electronic device with the first output current or the second output current selected by the user.

12. The electronic device of claim 11, further comprising a detecting unit which is operative to detect a charge parameter and to judge whether the charge parameter is above a preset threshold, wherein the transmitting unit is operative to transmit the first information to the charger in response to the charge parameter being above the preset threshold.

13. The electronic device of claim 11, further comprising a detecting unit which is operative to detect a charge parameter, wherein the transmitting unit is operative to transmit the charge parameter obtained by the detecting unit, to the charger.

14. A computer readable storage medium embodied with a computer program instruction which, when executed by a processor of a computer, performs a method comprising:
a charger receiving first information from an electronic device, wherein the charger has a first parameter associated therewith;
the charger determining a charge state of the electronic device by determining whether the first information is received or not in the first preset time period and generating a first instruction in response to an abnormal charge state of the electronic device, wherein the abnormal charge state is determined by a preset signal value indicated by a current charge parameter of the electronic device;
the charger adjusting power supplied to the electronic device based on the first instruction;
the charger acquiring second information of the electronic device before supplying power to the electronic device, the second information indicating a second parameter of the electronic device and the second parameter comprises an identification, a manufacture name, and/or a type of the electronic device;
the charger determining whether the second parameter matches with the first parameter of the charger; and
the charger supplying power to the electronic device in a preset manner in response to the second parameter mismatching the first parameter;
wherein the preset manner comprises:
providing notifying information to indicate that the charger is supplying power to the electronic device with a first output current or a second output current, the first output current being greater than the second output current;
determining which of the first output current and the second output current is supplied to the electronic device by the charger according to a selection operation by a user; and
supplying power to the electronic device with the first output current or the second output current selected by the user.

15. A method of charging an electronic device at a preset time period, the method comprising:
the charger acquiring information of the electronic device before supplying power to the electronic device, wherein the charger has a first parameter associated therewith and the information indicating a second parameter of the electronic device and the second parameter comprises an identification, a manufacture name, and/or a type of the electronic device;
the charger determining whether the second parameter matches with the first parameter of the charger; and
the charger supplying power to the electronic device in a preset way in response to the second parameter mismatching the first parameter;
wherein the preset way comprises:
providing notifying information to indicate that the charger is supplying power to the electronic device with a first output current or a second output current, the first output current being greater than the second output current;
determining which of the first output current and the second output current is supplied to the electronic device by the charger according to a selection operation by a user; and supplying power to the electronic device with the first output current or the second output current selected by the user.

16. The method of claim 15, further comprising:
the charger receiving second information from the electronic device;
  the charger determining a charge state of the electronic device by determining whether the second information is received or not in the preset time period, and generating an instruction in response to an abnormal charge state of the electronic device, wherein the abnormal charge state is determined by a preset signal value indicated by a current charge parameter of the electronic device; and
  the charger adjusting power supplied to the electronic device based on the second instruction.

17. The method of claim 16, further comprising the charger increasing the power supplied to the electronic device in response to a reception of the second information by the charger.

18. The method of claim 17, wherein the charge state of the electronic device is determined to be in abnormal in response to not receiving the second information by the charger from the electronic device within the preset time period.

19. The method of claim 16, wherein the second information is a charge parameter of the electronic device, and determining whether the charge state of the electronic device is abnormal comprises:
  judging whether the received charge parameter is above a preset threshold; and
  determining that the charge state of the electronic device is abnormal in response to the charge parameter being above the preset threshold.

20. The method of claim 16, wherein the charger adjusting the power supplied to the electronic device comprises: the charger lowering an output current and supplying the lowered output current to the electronic device.

* * * * *